(12) United States Patent
Oreshkin et al.

(10) Patent No.: US 12,131,236 B2
(45) Date of Patent: Oct. 29, 2024

(54) SYSTEM AND METHOD FOR DETECTING SIMILARITIES

(71) Applicant: SERVICENOW CANADA INC., Montreal (CA)

(72) Inventors: Boris Oreshkin, Montreal (CA); Bahador Khaleghi, Montreal (CA); Francois Maillet, Montreal (CA); Paul Gagnon, Montreal (CA)

(73) Assignee: ServiceNow Canada Inc., Montreal (CA)

( * ) Notice: Subject to any disclaimer, the term of this patent is extended or adjusted under 35 U.S.C. 154(b) by 753 days.

(21) Appl. No.: 17/259,713

(22) PCT Filed: Jul. 11, 2019

(86) PCT No.: PCT/CA2019/050954
§ 371 (c)(1),
(2) Date: Jan. 12, 2021

(87) PCT Pub. No.: WO2020/010459
PCT Pub. Date: Jan. 16, 2020

(65) Prior Publication Data
US 2021/0133951 A1    May 6, 2021

Related U.S. Application Data

(60) Provisional application No. 62/697,045, filed on Jul. 12, 2018.

(51) Int. Cl.
*G06T 7/00* (2017.01)
*G06F 18/21* (2023.01)
(Continued)

(52) U.S. Cl.
CPC ............ *G06N 20/00* (2019.01); *G06F 18/217* (2023.01); *G06Q 10/06395* (2013.01);
(Continued)

(58) Field of Classification Search
CPC ................. G06T 1/0028; G06T 7/0006; G06T 2201/0051; G06N 20/00; G06N 3/08;
(Continued)

(56) References Cited

U.S. PATENT DOCUMENTS 5,835,901 A     11/1998   Duvoisin, III
8,995,762 B2 *  3/2015    Ito ........................ G06T 1/0028
                                                    382/164

(Continued)

FOREIGN PATENT DOCUMENTS

EP    0482427 A2       4/1992
JP    5913903 B2 *     4/2016
WO    2006042142 A2    4/2006

*Primary Examiner* — Hoa Q Pham
(74) *Attorney, Agent, or Firm* — FASKEN MARTINEAU DUMOULIN LLP; Ray Kovarik

(57) ABSTRACT

Systems and methods for determining similarities between an input data set and a target data set with the data sets being vector representations of the features of a candidate potential copy and a target original. A feature extraction module receives an image of the potential copy and extracts the features of that candidate. The features of the target original may already be extracted or may be separately extracted. The resulting data sets for the candidate and the original are then passed through a decision module. The decision module determines a level of similarity between the features of the candidate and the features of the original. The output of the decision module provides an indication of this level of similarity and, depending on this level of similarity, an alert may be generated. A report module may be included to provide an explanation regarding the level of similarity.

18 Claims, 7 Drawing Sheets

(51) Int. Cl.
*G06N 20/00* (2019.01)
*G06Q 10/0639* (2023.01)
*G06V 10/75* (2022.01)
*G06Q 30/018* (2023.01)
*G06V 20/00* (2022.01)

(52) U.S. Cl.
CPC .......... *G06T 7/0006* (2013.01); *G06V 10/758* (2022.01); *G06Q 30/018* (2013.01); *G06V 20/95* (2022.01)

(58) Field of Classification Search
CPC ......... G06K 2009/0059; G06K 9/6262; G06K 9/4652; G06K 9/46; G06Q 10/06395; G06V 30/414; G06V 10/40
USPC .......................... 382/141, 164, 165; 707/749
See application file for complete search history.

(56) References Cited

U.S. PATENT DOCUMENTS

| | | | |
|---|---|---|---|
| 2010/0092093 A1* | 4/2010 | Akatsuka | ............... G06Q 30/00 382/218 |
| 2018/0253676 A1* | 9/2018 | Sheth | ............... G06Q 10/06393 |
| 2020/0143209 A1* | 5/2020 | Lacoste | ................... G06N 3/08 |

* cited by examiner

SYSTEM AND METHOD FOR DETECTING SIMILARITIES

CROSS REFERENCE TO RELATED APPLICATIONS

The present application is a U.S National Phase Application pursuant to 35 U.S.C § 371 of International Application No. PCT/CA2019/050954 filed Jul. 11, 2019, which claims priority to U.S. Provisional Patent Application No. 62/697, 045 filed Jul. 12, 2018. The entire disclosure contents of these applications are herewith incorporated by reference into the present application.

TECHNICAL FIELD

The present invention relates to the analysis of features to determine similarities. More specifically, the present invention relates to systems and methods for determining similarities between representations that describe a given item and those that describe potential imitations of that given item as compared to a certain baseline item or frame of reference.

BACKGROUND

Current marketplaces for goods and services have become crowded spaces, where distinguishing oneself from competitors or other market entrants, and in turn identifying those that may have not sufficiently done so, is an increasingly difficult task to meet. For example, owners of works that are copied (whether these works are copyrighted images, registered designs, patented designs, marketing materials, product packaging, etc.) are faced with the burden of policing the marketplace for copycats that copy such works. To this end, owners of the rights to these works must scour not only online marketplaces but also printed materials and even physical markets and other places of business to find potential copiers of these works.

Once instances of possible copies of the works have been found, a manual process to determine whether there is enough similarity between the original and the potential copy is applied. As can be imagined, this process may be time consuming and lengthy, consuming the owner's resources of time, money, and effort. Trendspotting or comparing items to specific frames of reference of examples also suffer from the same issues.

From the above, an automated process or system that consumes fewer resources would be useful. Such a process preferably takes images, descriptions or other representations (such as a 3D CAD model or laser scans) of the potential copy and representations of the original and compares these. In this document, multimodal representations of a product will be referred to as a product signature. A product signature is therefore a representation of a product or item. A preferable output would be a determination of the similarity between the potential copy and the original. Depending on the level of similarity, other actions can then be taken if desired.

SUMMARY

The present invention provides systems and methods for determining similarities between an input data set and a target data set with the data sets being product signatures of a candidate potential copy and a target original. A feature extraction module receives a product signature of the potential copy and extracts the features of that candidate. The features of the target original may already be extracted or may be separately extracted. The features for the candidate and the original are then passed through a decision module. The decision module determines a level of similarity between the features of the candidate and the features of the original. The output of the decision module provides an indication of this level of similarity and, depending on this level of similarity, an alert may be generated. The system may also provide for user validation of this output as the output and the product signatures of the candidate and the original may be provided to as user to validate the decision module result. Results of user supplied validation may be fed back to the system as training inputs to result in better decision module results. The output may also be augmented with an explanation that outlines aspects of the potential copy and of the original that contribute to their similarity. One way to represent the explanation is for instance with heat-map overlaid on the potential copy.

In a first aspect, the present invention provides a method for determining a similarity between an input data set detailing features relating to an input product signature and a target data set detailing features relating to a target product signature, the method comprising:
  a) extracting a vector representation of features of said input product signature to result in said input data set;
  b) passing said input data set through a decision module to determine a level of similarity between said features of said input product signature and said features of said target product signature, said decision module being constructed and arranged to detect and assess similarities between said features of said target in said target data set and features in said input image;
  c) receiving a data output from said decision module, said data output being indicative of a level of similarity between said features detailed in said input data set and said features detailed in said target data set;
  d) in the event said data output conforms to at least one predetermined criterion, generating an alert.

In a second aspect, the present invention provides a system for detecting similarities between at least one candidate product signature and a target product signature, the system comprising:
  a feature extraction module receiving said product signature and producing a vector representation of features of said product signature;
  a decision module, said decision module receiving said vector representation of features of said product signature and said decision module being for comparing features of said product signature and features of said target product signature;
wherein
  an output of said decision module is indicative of a level of similarity between features in said product signature and features of said target product signature.

BRIEF DESCRIPTION OF THE DRAWINGS

The embodiments of the present invention will now be described by reference to the following figures, in which identical reference numerals in different figures indicate identical elements and in which.

DETAILED DESCRIPTION

As noted above, a product signature is a representation of a product or an item. A product signature can thus take the form of one or more 2D images of the same product from one or more angles, one or more descriptions of a given product in one or more languages, one or more 3D CAD models, one or more laser scans, audio descriptions, or sound recordings of the product, etc.

Figure 1:
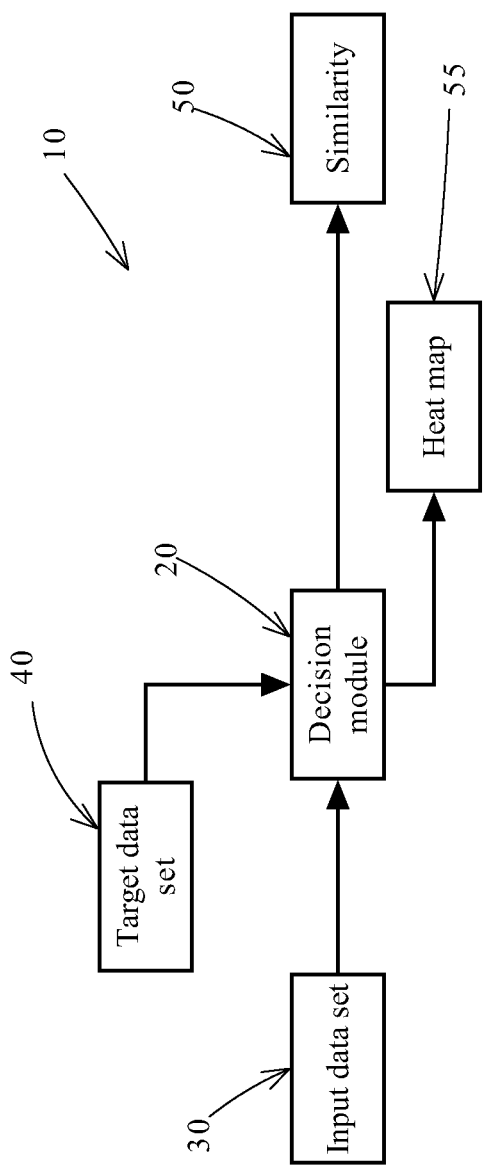
FIG. 1 is a block diagram of a base system according to one aspect of the present invention.

Referring to FIG. 1, a block diagram of one configuration of one aspect of the present invention is illustrated. The system 10 has a decision module 20 that receives an input data set 30 and a target data set 40. The input data set details the features of a candidate for a potential copy of a target original. The target data set 40 details the features of the target original. The decision module 20 receives these two data sets and produces an output 50 that indicates a level of similarity between these two data sets. An explanation heat map 55 may also be produced to provide an explanation regarding the output.

Figure 2:
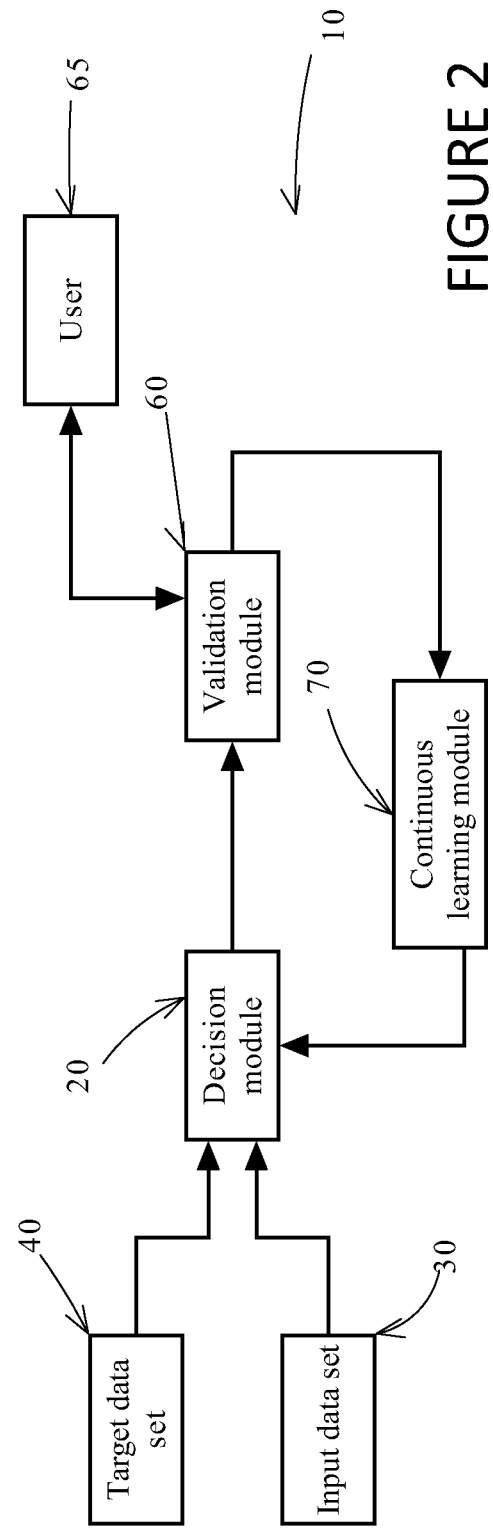
FIG. 2 is a schematic block diagram of a variant of the system in FIG. 1.

Referring to FIG. 2, a block diagram of another configuration of another aspect of the present invention is illustrated. In FIG. 2, the system 10 includes a validation module 60 and a continuous learning module 70. The output 50 (not shown in FIG. 2) from the decision module 20 is sent to the validation module 60. The validation module 60 then sends this output (and whatever other data may be necessary) to a user 65 for validation. The user 65 determines if the output from the decision module 20 is correct based on the candidate and the target. The user's decision regarding the validation is then received by the validation module 60. The user's decision is then sent by the validation module 60 to the continuous learning module 70 to be used in training a model used by the decision module 20 to determine the level of similarity between the data sets it receives.

Figure 3:
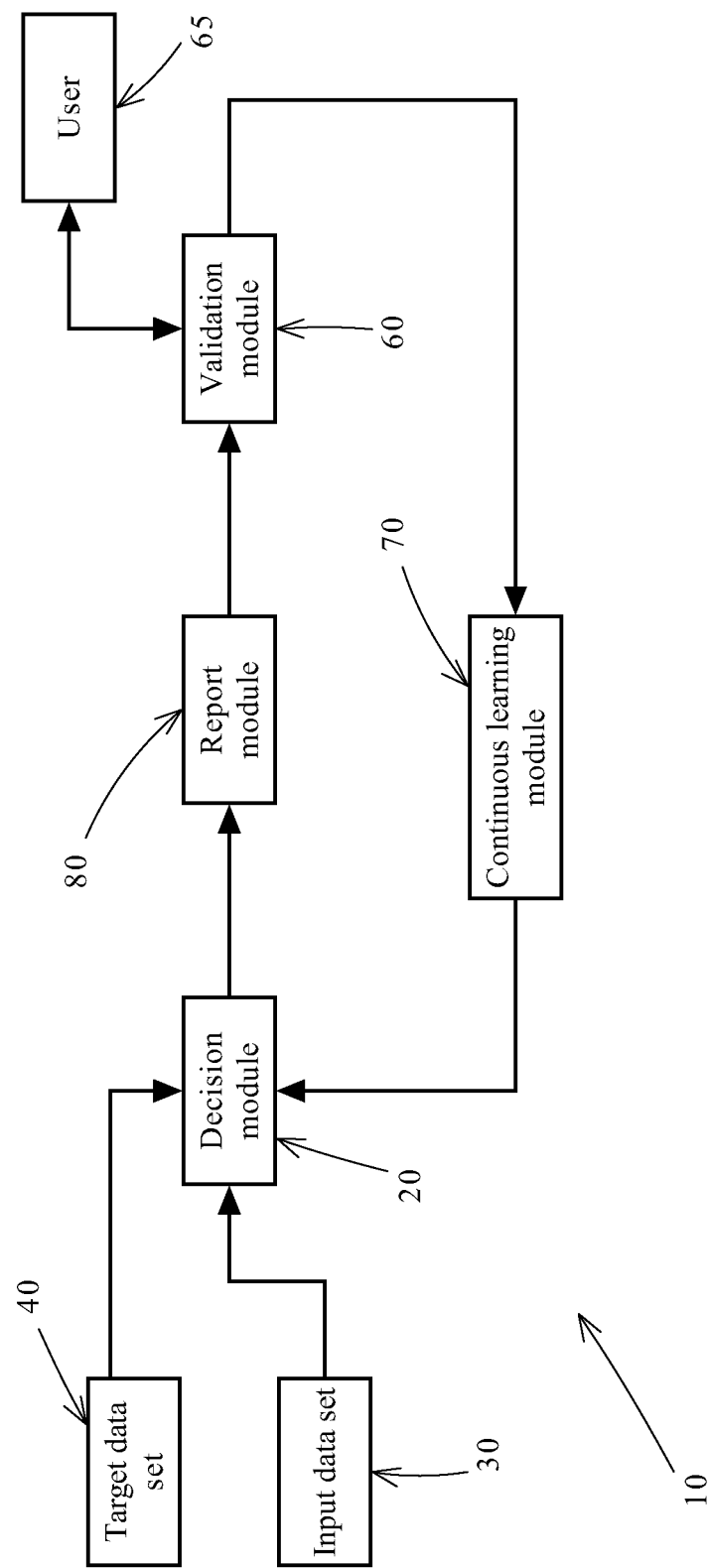
FIG. 3 is a schematic block diagram of a further variant of the systems illustrated in FIGS. 1 and 2.

Referring to FIG. 3, a farther variant of the configuration of one aspect of the invention is illustrated. In this variant, a report module 80 receives the output 50 (not shown in FIG. 3) from the decision module 20. The report module 80 formulates a report that provides an explanation of the output 50 based on the data sets received by the decision module 20. The report from the report module 80 is then sent to the validation module 60 for forwarding to the user 65. The user 65 can then use the report to determine whether the output 50 of the decision module 20 can be validated. As well, the user 65 can use this report, along with the output 50 from the decision module 20, to determine whether further action is required regarding the candidate for a potential copy of the original.

Figure 4:
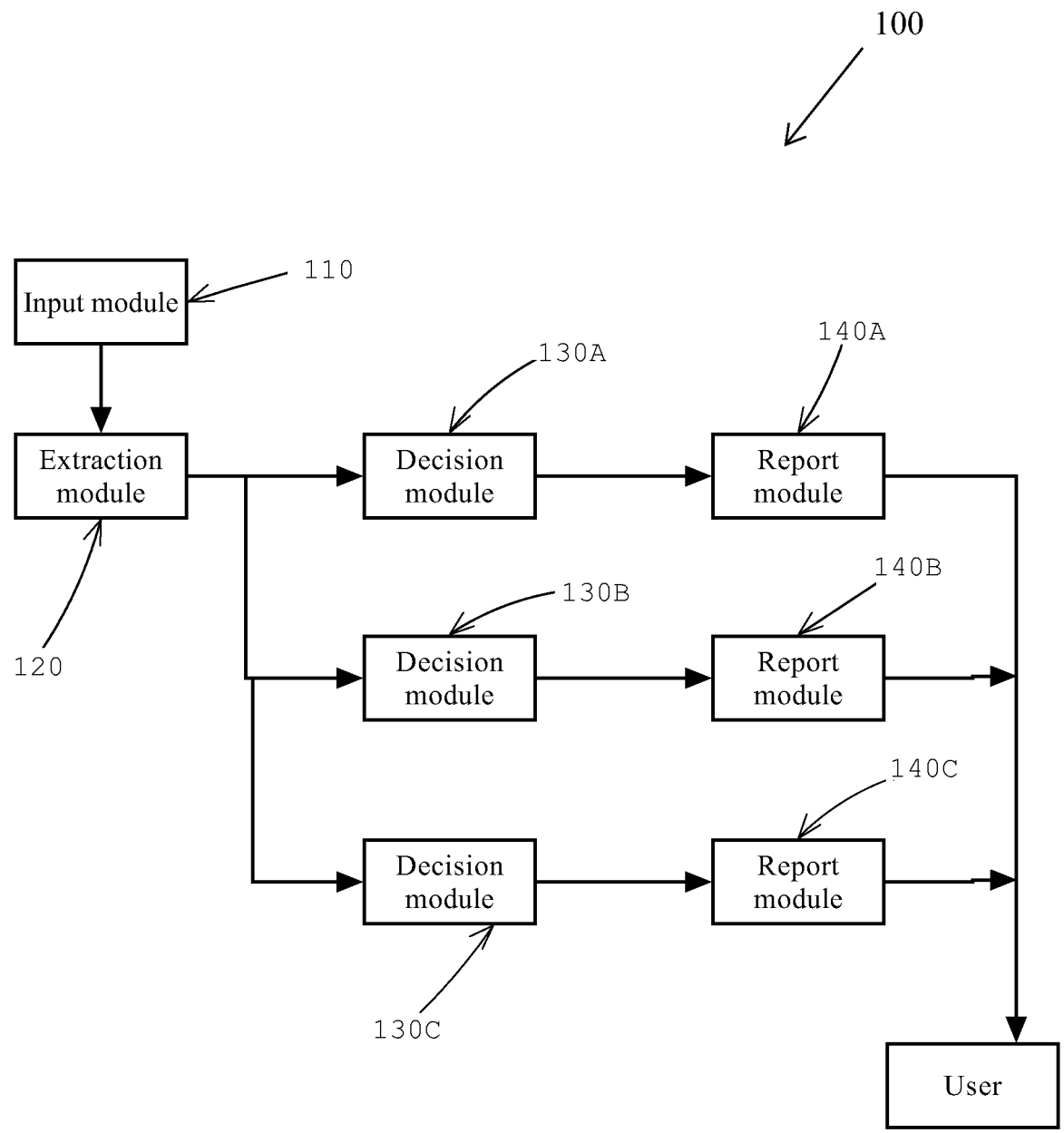
FIG. 4 is another system overview of a similar implementation of a system according to another aspect of the present invention

It should be clear that the systems illustrated in FIGS. 1-3 can form the basis for more complex and more advanced systems that accomplish similar if not the same ends. As can be seen from FIGS. 1-3, each decision module in these figures compare the input data set if a single target data set to thereby effectively compare the features of a single candidate with a single target. Referring to FIG. 4, a system 100 is illustrated that can perform multiple comparisons between a single candidate data set and multiple target data sets. In FIG. 4, an input module 110 produces/receives one or more product signatures of the candidate for a potential copy. The input module 110 then passes these one or more product signatures (which may be images) to a feature extraction module 120 that extracts the features of the candidate into a single input data set. In one implementation, the input data set is a vector representation of these features of the candidate.

Once the candidate data set has been created, this can then be distributed among a number of decision modules 130A, 130B, 130C. Each decision module each decision module has an associated report module 140A, 140B, 140C. In operation, the system 100 has the input module 110 receiving and/or extracting product signatures of a candidate. These product signatures are then sent to the feature extraction module 120 for the extraction module to extract the features of the candidate from the product signatures. The resulting data set (representing the features of the candidate and which may simply be a vector representation of the candidate's features) is then sent to each of the decision modules 130A, 130B, 130C. Each decision module 130A, 130B, 130C is designed to compare candidate features against the features of one specific target. The output of each decision module 103A, 130B, 130C is then received by a corresponding report module 140A, 140B, 140C and a report based on that output is created by each report module. The various reports and outputs of the decision modules are then sent to the user for validation by way of a validation module (not shown in FIG. 4).

It should be clear that, in one specific implementation, each decision module is designed to produce a similarity score that indicates a level of similarity between the features of its one specific target and the features of the candidate from the input data set. Based on the similarity score and whether that score meets or exceeds a predetermined threshold, the features of the candidate are passed to the relevant report module. The report module then creates a report that explains the system's decision regarding the similarity and, in one implementation, also provides explanatory images. It should be noted that the term "similarity score" includes the concept of a "dissimilarity score" or a score that indicates a level of difference between the features of the target and of the candidate.

It should also be clear that the input module 110 may receive product signatures for a candidate or the module 110 may retrieve such product signatures from various sources including both online and offline sources.

Regarding the feature extraction module 120, the module may include a fully trained neural network trained to extract the features of the images and of the data associated with the candidate. The relevant features of the candidate may be provided in a vector representation of the candidate. In one embodiment, the neural network only uses product signatures of the candidate product that has been input into the neural network to produce the vector representation. In another embodiment, text associated with the candidate product can be processed by a separate text feature extractor. The output representations from the feature extractor module and from the text feature extractor can be joined appropriately to form a joint representation. This joint representation can then form the input data set that is sent to the decision modules. It should, of course, be clear that, in addition to features extracted from product signatures of the candidate, other features extracted from other representations of the candidate (e.g. text) can also be used.

In another variant of the system illustrated in FIG. 4, instead of multiple decision modules, a more advanced variant may use a single decision module to compare the input data set with multiple target data sets. Depending on the implementation of such a variant, a single report module may be used or different report modules may be used for the various target data sets being compared with the input data set.

Figure 5:
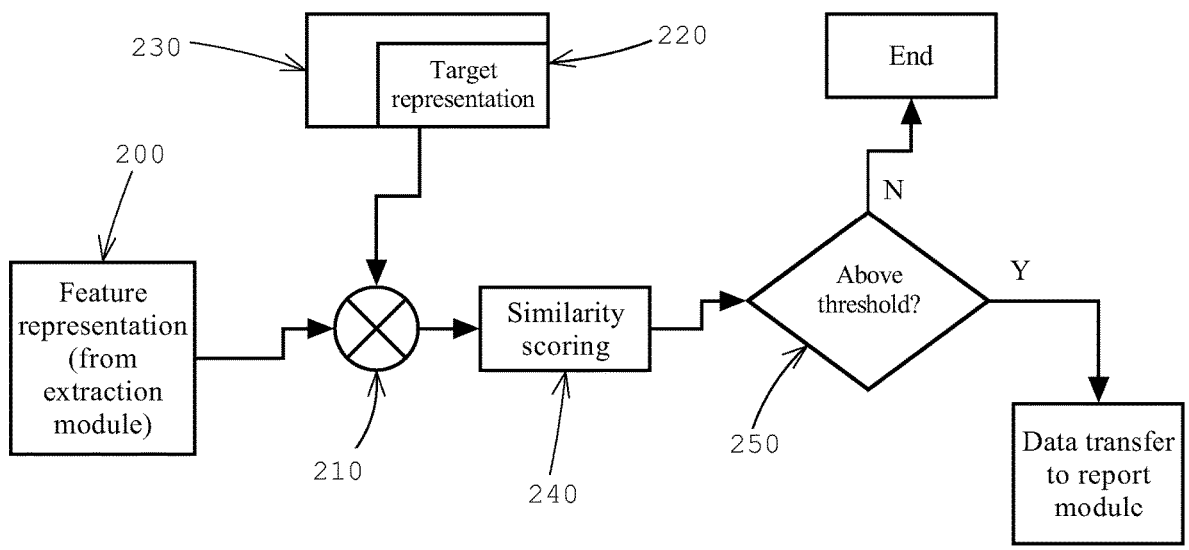
FIG. 5 is a block diagram of an implementation of a decision module according to one aspect of the present invention.

In another embodiment, the decision module 130A, 130B, 130C may have an internal configuration as illustrated in FIG. 5. In this embodiment, the data set 200 from the extraction module 120 is received by a comparison submodule 210 along with another data set 220. This other data set 220 is stored in a storage submodule 230 within the decision module and is a feature representation of a specific target. This feature representation of the specific target was previously and separately extracted from product signatures and/or data associated with the target. The comparison submodule compares the two data sets (i.e. the two feature representations for the candidate and the specific target) and produces a similarity score 240 detailing a level of similarity between the two data sets. The similarity score is then passed through a decision block 250 that determines if the score is suitable for reporting to the user. If the score is not suitable according to one or more predetermined criteria, then the process may end. However, if the score is such that it conforms to one or more predetermined criteria (e.g. the score is above a predetermined threshold, the score is below a predetermined threshold, the score indicates a potential cause for concern, statistical analyses of previous results indicates a potential concern, there are indications of similarities between specific areas of the candidate and the target, etc., etc.), the score is sent on for a data transfer to a report module. As can be seen, a generic comparison submodule is used along with a stored feature representation of a specific target. For this variant, the feature representation for each target is extracted (e.g. using a feature extraction neural network similar to that used in the extraction module) and stored in different decision modules.

It should also be clear that while the configuration in FIG. 5 indicates the use of a similarity score, other variants may use other representations of the level of similarity (or dissimilarity) between the input data set and the target data set. As another variant, the level of similarity between the data sets may be determined with reference to previous data sets.

Figure 6:
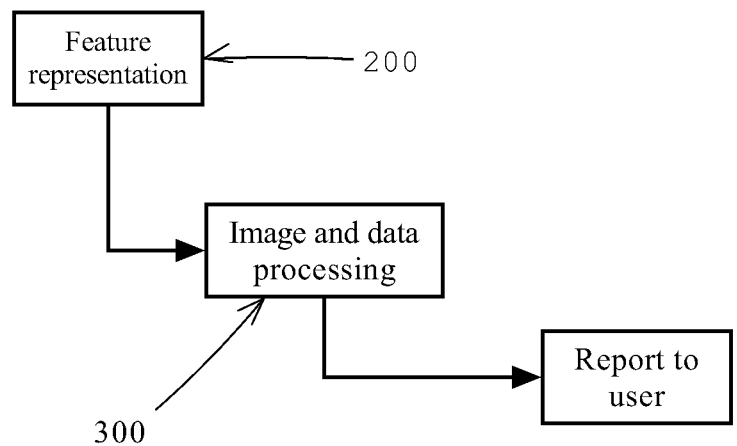
FIG. 6 is a block diagram detailing an overview data flow for a report module according to the system illustrated in FIG. 4.

Regarding the report module 140A, 140B, 140C, this may be configured as shown in FIG. 6. Once the similarity score indicates that the candidate product and the target product are sufficiently similar to warrant a review by a user, the data set 200 and the image of candidate from the extraction module 120 are received by the report module. The report module then processes these in conjunction with product signatures of the specific target. It should be clear that, in one implementation, since the report module is specific to a specific decision module (and thus specific to a specific target), the product signatures and/or feature representation of the specific target can be stored within the report module. The processing within the submodule 300 may take the form of generating a heat map overlaid on top of the product signature (e.g. an image) of the candidate product. The heat map (a graphical representation of data where the individual values contained in a matrix are represented as colors) can be generated in conjunction with the target product's product signature and the two data sets representing the feature representations of the candidate product and the target product. Thus, a heat map overlaid over one or more product signatures of the candidate product would give a user a visual indication as to which areas of candidate product's product signature are most similar to the target product. The report produced by the report module may include not just the heat map overlaid over the candidate product's product signatures but also the target product images so that a user may visually compare the two products and determine if the system's conclusion about the similarity score is to be validated or not.

It should be clear that, in addition to the product signatures of the candidate and the target, the report module may also produce explanations regarding the level of similarity and the system's conclusion about the candidate. This can be done by using the LIME (Local Interpretable Model-Agnostic Explanations) framework. The LIME framework is explained in the paper located at http://arxiv.org/pdf/1602.04938v1.pdf, the entirety of which is hereby incorporated by reference. Reference can also be made to the explanations at https://www.oreilly.com/learning/introduction-to-local-interpretable-model-agnostic-explanations-lime, the contents of which are hereby incorporated herein by reference. Thus, explanations of the conclusions of the system along with images of the candidate and target, along with a suitable heat map, are produced by the report module. These are provided to the user so that the user may intelligently determine if the conclusions are to be validated or not. It should be clear that, should the representations being compared involve text or textual features or representations other than an image representation, other explanations or reports may be produced. As such, visual, auditory, text, or other means of producing such explanations may be used. It should be clear that the heat map discussed above is only provided as an example of an explanation of how or why two product signatures are similar or dissimilar.

Figure 7:
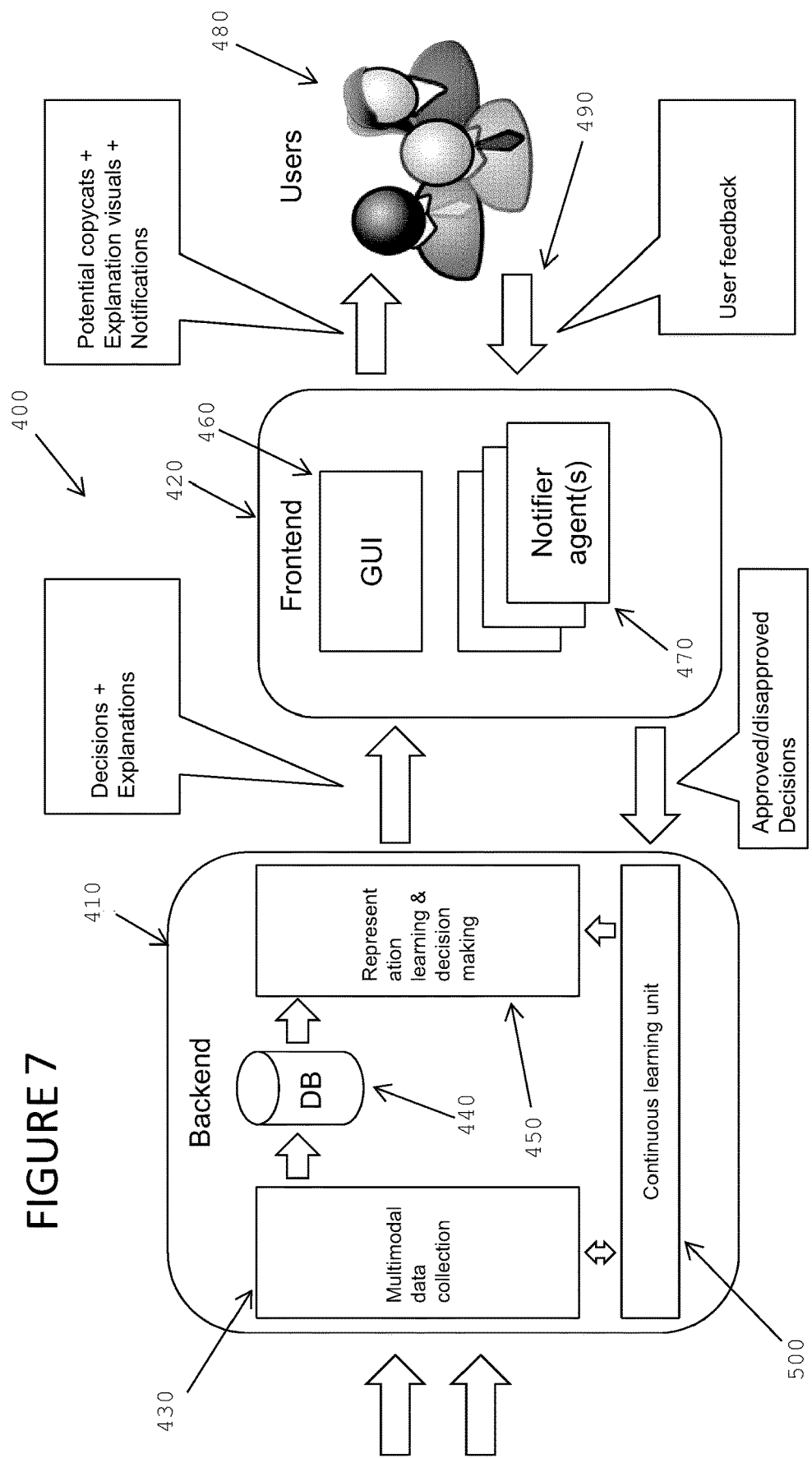
FIG. 7 is a system overview block diagram of a system according to one implementation of the present invention.

Referring to FIG. 7, a block a system overview/block diagram of a specific implementation of one aspect of the present invention is illustrated. This implementation uses the various concepts detailed above for the variants of the present invention. As can be seen, the system 400 has a backend 410 communicating with a front end 420. The backend subsystem includes a data collection module 430 that collects data from outside the system. The data collected may include images, text, and other data from websites that may be copying original or target products. The images, text, and other associated data for these potentially copied candidates are then stored in a database 440. The features of these candidates are then extracted from these product signatures and compared against the features of the various targets in a learning and decision making module 450. If the level of similarity between the candidate and any of the targets exceeds a predetermined threshold, the data regarding the target and the candidate that generated this level of similarity is transferred to the frontend subsystem 420.

The frontend subsystem 420 includes a graphical user interface (GUI) 460 and a number of notifier agents 470. The data for the candidate product and the relevant target products are sent to the user 480 by way of the GUI 460 using the notifier agents 470. The user 480 can then determine if the similarity between the candidate product and the target products is sufficient to warrant further action. If the similarity score assigned by the model requires explanation, the system can validate the system's conclusion regarding the level of similarity based on explanations provided by the backend 420. The user validates the system's conclusion or the user can reject the system's conclusion. Regardless of the user's conclusion and actions, the user's decision can be used as feedback 490 by way of the GUI. The decisions can then be forwarded to the teaming unit 500. These decisions can then be taken into account as the system teams to perform better comparisons.

It should be noted that the data sent to the user can include not just images and/or product signatures of the candidate and of the target but also explanations of the system's conclusion regarding the similarity between the candidate and the target. These explanations can also be automatically generated along with the similarity score.

Figure 8:
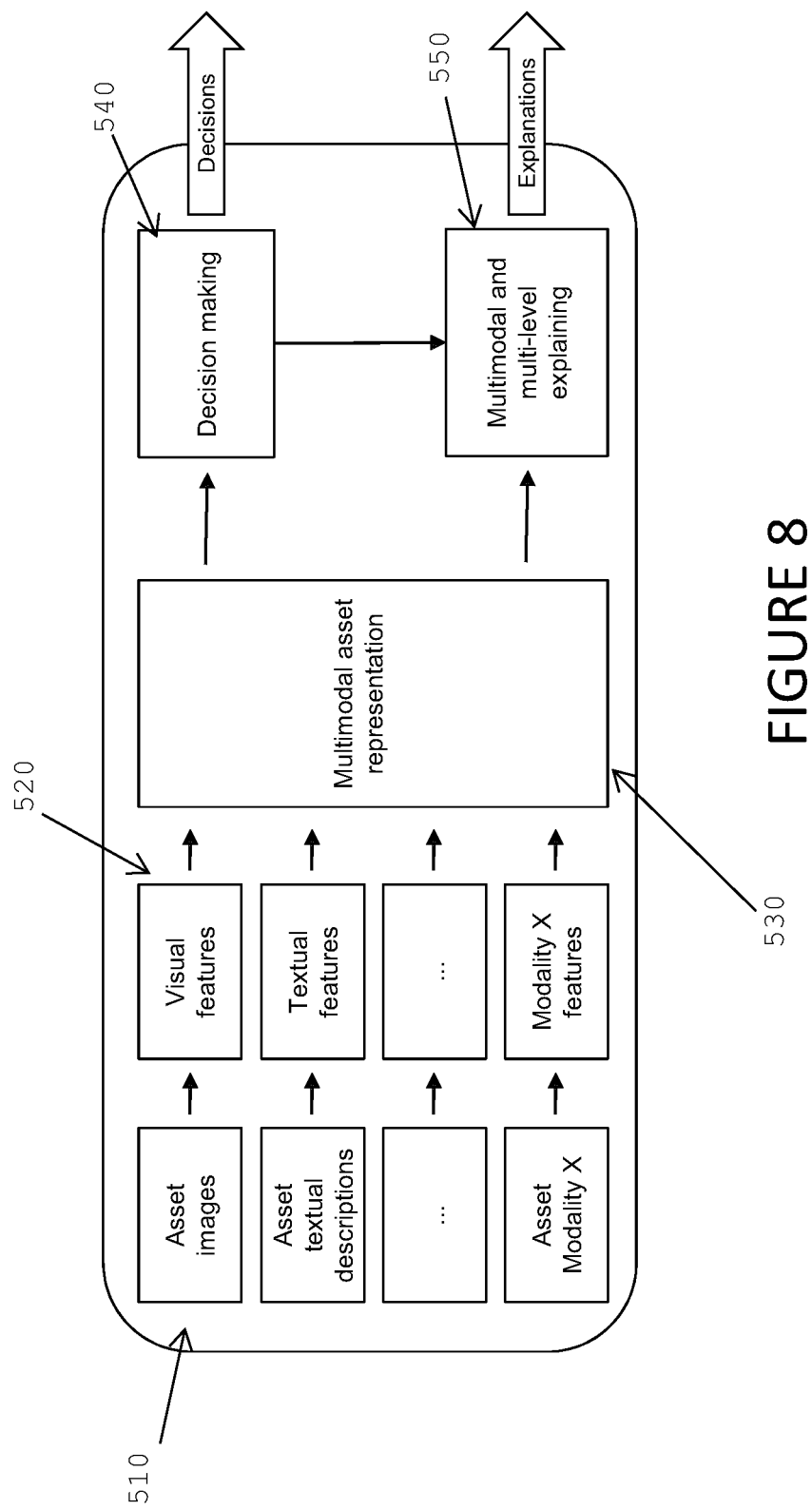
FIG. 8 is a schematic block diagram of data flow for the system illustrated in FIG. 7.

Referring to FIG. 8, a schematic block diagram of the data flow for one implementation of the present invention is illustrated. As can be seen, product signatures 510 of a candidate are used to extract its features 520. It should be clear that such features may include text present on the actual candidate. In addition, text associated with the candidate (e.g. the text description of the candidate) is used to extract the textual features of the candidate. Other features for the candidate can be extracted using other data associated with the candidate. These features are extracted using the feature extraction module 530 shown in FIG. 8. The extracted features are then sent to a decision making module 540 where the features are compared against the features of at least one of the targets. Based on the level of similarity between the features (detailed by a similarity score in one implementation), a decision is made as to whether the features of the candidate are similar enough to the features of a specific one of the targets. In one implementation, the similarity score is the metric by which level of similarity is assessed. If the similarity score is above a specified, predetermined threshold, then the target and the candidate are determined to be similar enough and may require further action. If this determination is made, the decision making module then passes on the target product features, target product images, candidate product features, and candidate product images (i.e. the product signatures) to an explanation or reporting module 550. This module 550 creates a report that explains why the system determined that the level of similarity between the candidate product and the target product is above the predetermined threshold. The report and/or explanations are then sent to the user along with the decision from the decision making module.

It should be clear that the systems and methods of the invention as well as its variants and different configurations may be used in a myriad of ways. In one implementation, a company's target/original products are imaged and the text data associated with each product is associated with each relevant product (i.e. the product signatures for each product is determined and/or extracted). Thus, for example, a company's laundry detergent product may have images of the packaging along with descriptive text used as a data set. This target product data set can then be used to train a neural network, along with other known detergents with similar looking marketing and/or packaging, to detect and/or formulate similarity scores. The fully trained neural network can then be incorporated into a suitable decision module. Alternatively, the target product data set can be used with a feature extraction trained neural network (similar to that used in the extraction module) to extract the vector representation of the target product's features. The extracted vector representation can then be stored in a suitably configured decision module as described above. The above process can then be replicated for each of that company's multiple products such that, when the process is complete, each decision module is configured to detect and compare a specific target product's features with the features of a candidate product.

From the above, once the decision modules have been configured and any relevant neural networks have been trained, data can then be gathered for potential copycat or copied products. This can be accomplished by having a module (either the input module or a suitable external data gathering module) gather data from any number of both online and offline sources. Thus, in the example above, multiple retailer websites and/or multiple supplier/manufacturer websites for laundry detergent products (or other household consumer goods) can have their data extracted. Images of each candidate product and any text associated with this candidate product (as well as other product signatures) can then form a data set to be fed into the extraction module such that a feature representation of the candidate product's features can be extracted. Once these features are extracted, they can then be compared to the features of the company's original target products by way of the decision modules. Should any candidate products be suitably similar in terms of packaging and/or image features, an alert (e.g. an email alert) can be sent to a user along with a suitable report from the report module. The user can then validate or reject the system's conclusions.

It should be clear that the systems and methods of the present invention may be used to compare the features of a candidate with the features of a target. The candidate and the target may be products, images, packaging for products, text, business indicia (e.g. logos and/or trademarks), text relating to specific products, marketing material, drawings, and/or material capable of being printed, manufactured, displayed, or protected by an intellectual property regime.

In another implementation, instead of comparing the packaging/marketing text/ingredient list/other features of a candidate product with that of a target product, the system can be used to determine a similarity between various business marking indicia such as trademarks and/or logos. For such an implementation, one or more images of candidate indicia (e.g. a trademark or logo) can operate as input to the extraction module. The features of such a candidate indicia can then be extracted. As a variant, the feature extraction process may include extracting any text contained within the indicia and performing an optical character recognition (OCR) process on the extracted text. This extracted text (which may be, for example, a product name or a trade name or a company name) can then form part of the feature representation for the indicia. The resulting data set from the extraction module can then be compared against other indicia by way of the decision modules as noted above. Such as system can be used by trademark offices, law firms, and other organizations dealing with trademarks, trade names, and/or logos as well as other business related indicia to determine if a proposed indicia is similar to (and therefore potentially confusing) with an existing indicia. To cut down on the number of potential comparisons to be made, the decision modules may be based on indicia for a specific class or a specific goods/service associated with the indicia. The system can thus automatically assess similarities between proposed and registered trademarks, thereby reducing the workload for trademark examiners.

It should be clear that the OCR feature noted above can also be used when the system is used to compare features of candidate products and original or target products.

In addition to the above, the system may also be used to determine similarities between registered industrial designs/design registrations/design patents and a proposed design. The images associated with the proposed design can be used as the input to the extraction module while the various decision modules can be based on already registered or currently pending industrial design registration and/or design patents. Similar to the trademark based implementation above, this implementation of the system can be used to lower the workload on industrial design examiners or on design patent examiners as the system can automatically compare and detect similarities between proposed and registered designs.

In a slightly different context, the system may be used by firms and/or companies seeking to detect potential trademark or design infringements. In the context described above for a company's original target products, any similar candidate products may be an instance of trademark and/or design registration infringement. The alert and the report generated from the system can thus be sent to the company's legal department for further action. Should the user (who may be in the company's legal department) determine that the system's conclusion is valid, further legal action may be taken. The system can thus provide an initial indication of potential intellectual property infringement.

As another variant, the systems and methods of the invention may be used to determine risks of potential infringement of intellectual property rights for a potential product or a potential business related indicia (e.g. a potential trademark). For this use case, images of the potential product/indicia may be used as the input to the feature extraction module. Once the vector representation of the potential product/indicia has been created, this can then be compared (using the rest of the system as detailed above) against other registered products/indicia. If the projected candidate is similar enough to an existing product/indicia, then there might be a danger of infringing the rights of the owner of the registered intellectual property. It should be clear that, in another variant, the system may be used to generate indications of the dissimilarity between the potential product/indicia and the other registered products/indicia. The similarity score noted above may thus be a dissimilarity score that indicates the level of dissimilarity between one product/indicia and another product/indicia.

In yet a further variant, the systems and methods of the present invention can also be used in the quality assurance (QA) context. In implementations that generate a heat map between two samples being compared (as detailed above), the resulting heat map can be used to detect defects and issues with a product. In this variant, a sample product without defects is compared with an end product that might have defects. The similarity score should be quite high as one would not expect differences between the sample and the end product. Any major differences (i.e. any dissimilarities) between the two can be a defect in the end product. To detect where the defect may lie, the heat map generated should localize the differences between the sample and the end product.

The embodiments of the invention may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g. "C") or an object-oriented language (e.g. "C++", "java", "PHP", "PYTHON" or "C#") or any suitable programming language (e.g. "Go", "Dart", "Bash", etc.). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

We claim:

1. A computer-implemented method for determining a similarity between an input data set detailing features relating to an input product signature and a target data set detailing features relating to a target, the computer-implemented method being executed by at least one processor operatively connected to a non-transitory storage medium, the computer-implemented method comprising:
   extracting a vector representation of features of said input product signature to result in said input data set;
   processing said input data set to determine a level of similarity between said features of said input product signature and said features of said target, and to detect and assess similarities between said features of said target in said target data set and features in said input product signature;
   receiving a data output from said processing step, said data output being indicative of a level of similarity between said features detailed in said input data set and said features detailed in said target data set;

in the event said data output conforms to at least one predetermined criterion, generating an alert;

sending said data output to a user for validation; and receiving results of said validation;

wherein said data output and said results of said validation are further processed for use in further training a model used in determining said level of similarity only when results of said validation and said data output indicate an error in said level of similarity.

2. The method according to claim 1, wherein said input product signature contains at least one of:

a trademark;
a logo;
business related indicial;
marketing material relating to a specific product;
product packaging relating to a specific product; and
at least one image of a specific product; and wherein said target data set detailing features relating to said target is derived by an analysis of at least one of:

a registered industrial design for a target product;
product packaging for a target product;
a copyrighted image;
a trademark;
a logo;
business related indicia; and
text relating to a target product.

3. The method according to claim 1, wherein said at least one predetermined criterion comprises said data output indicating a level of similarity above a predetermined level.

4. The method according to claim 1, wherein said target data set is derived from one or more written descriptions of said target.

5. The method according to claim 1, further comprising a step of generating an explanation heat map outlining aspects of said input product signature and said target to thereby provide an explanation of said data output.

6. A system for detecting similarities between at least one candidate product signature and a target, the system comprising: non-transitory storage medium storing instructions thereon; and at least one processor operatively connected to the non-transitory storage medium, the processor, upon executing the instructions, being configured for:

receiving said at least one candidate product signature and producing a vector representation of features of said at least one candidate product signature;

processing said vector representation of features of said at least one candidate product signature and comparing features of said at least one candidate product signature and features of said target;

wherein an output of said processing is indicative of a level of similarity between features in said at least one candidate product signature and features of said target, and the system is further configured for sending said output to a user for validation and configured for receiving user supplied validation results as training inputs to produce better similarity results.

7. The system according to claim 6, wherein said processing produces a similarity score detailing said level of similarity between said features in said candidate product signature and said features of said target.

8. The system according to claim 7, further configured for generating a report for a user whenever said similarity score exceeds a predetermined threshold, said report providing details regarding said similarity score.

9. The system according to claim 8, wherein said report also includes explanatory images.

10. The system according to claim 6, wherein only negative validation results are used to produce better similarity results.

11. The system according to claim 6, wherein said system generates an alert when an output of said processing conforms to at least one predetermined criterion.

12. The system according to claim 11, wherein said at least one predetermined criterion comprises said output of said processing indicating a level of similarity above a predetermined level.

13. The system according to claim 6, wherein said system outputs an explanation heat map that provides an explanation regarding said output.

14. The system according to claim 13, wherein said system is used for quality assurance purposes.

15. The system according to claim 14, wherein said system is used to detect defects in manufactured products by comparing a defect-free sample product and an end product.

16. The system according to claim 6, wherein said receiving said at least one candidate product signature and said producing said vector representation further includes a neural network trained to extract features of images and data associated with a candidate.

17. A system for detecting similarities between at least one candidate product signature and a target, the system comprising: non-transitory storage medium storing instructions thereon; and at least one processor operatively connected to the non-transitory storage medium, the processor, upon executing the instructions, being configured for:

receiving said at least one candidate product signature and producing a vector representation of features of said at least one candidate product signature;

processing said vector representation of features of said at least one candidate product signature and comparing features of said at least one candidate product signature and features of said target;

wherein an output of said processing is indicative of a level of similarity between features in said at least one candidate product signature and features of said target, said receiving said at least one candidate product signature and said producing said vector representation further includes a neural network trained to extract features of images and data associated with a candidate, and text associated with the candidate is processed by a separate text feature extractor.

18. The system according to claim 17, output representations form a joint representation including image and text.

* * * * *